United States Patent [19]

Hammerschmidt et al.

[11] Patent Number: 4,525,416

[45] Date of Patent: Jun. 25, 1985

[54] ADHESIVE TAPE

[75] Inventors: Peter Hammerschmidt, Wiesbaden; Günther Crass, Taunusstein, both of Fed. Rep. of Germany

[73] Assignee: Hoechst Aktiengesellschaft, Frankfurt am Main, Fed. Rep. of Germany

[21] Appl. No.: 491,165

[22] Filed: May 3, 1983

[30] Foreign Application Priority Data

May 4, 1982 [DE] Fed. Rep. of Germany ....... 3216603

[51] Int. Cl.³ .......................... B32B 5/30; B32B 5/16; B32B 27/32

[52] U.S. Cl. .................... 428/220; 428/323; 428/327; 428/352; 428/354; 428/516; 428/520; 428/523; 428/910; 428/916; 428/308.4; 428/315.9; 428/317.3; 428/317.9; 428/318.6; 428/319.9

[58] Field of Search ............... 428/354, 916, 910, 516, 428/323, 352, 520, 523, 424.2, 220, 308.4, 315.9, 317.3, 317.9, 318.6, 319.9, 327; 156/254, 344, 247, 234; 283/107, 108, 103

[56] References Cited

U.S. PATENT DOCUMENTS

| | | | |
|---|---|---|---|
| 3,089,786 | 5/1963 | Nachtsheim et al. | 117/122 |
| 4,082,873 | 4/1978 | Williams | 428/916 |
| 4,184,701 | 1/1980 | Franklin | 156/344 |
| 4,339,485 | 7/1982 | Shibano et al. | 428/40 |
| 4,343,851 | 8/1982 | Sheptak | 428/916 |
| 4,380,567 | 4/1983 | Shigemoto | 428/354 |
| 4,410,582 | 10/1983 | Tsunashima | 428/354 |
| 4,414,261 | 11/1983 | Wanbu | 428/354 |
| 4,439,493 | 3/1984 | Hein | 428/473.5 |
| 4,447,485 | 5/1984 | Aritake | 428/354 |
| 4,469,353 | 9/1984 | Anarwala | 428/916 |

FOREIGN PATENT DOCUMENTS

| | | |
|---|---|---|
| 2938471 | 4/1981 | Fed. Rep. of Germany . |
| 1102296 | 2/1968 | United Kingdom . |
| 2001079 | 1/1979 | United Kingdom . |
| 1562680 | 3/1980 | United Kingdom . |

Primary Examiner—Ellis P. Robinson
Attorney, Agent, or Firm—Schwartz, Jeffery, Schwaab, Mack, Blumenthal & Evans

[57] ABSTRACT

An adhesive tape is described, which is destroyed by delamination upon removal from a substrate but which may be unwound from a supply roll without destruction. The adhesive tape comprises an inner layer of a polyolefin having 2 to 6 carbon atoms containing in a finely distributed form solid organic particles with a size of from about 0.2 to 20 microns and polyolefin cover layers on both sides of the inner layer, one of which is coated with an adhesive and the other with a release coat.

13 Claims, 2 Drawing Figures

ADHESIVE TAPE

BACKGROUND OF THE INVENTION

The present invention relates to a multilayer adhesive tape based on a biaxially oriented polyolefin film, which during removal from a substrate is destroyed.

Adhesive tapes coated on one or both sides have been known for a long time. The first tapes had a support layer of cellulose hydrate. However, such tapes are highly sensitive to humidity or moisture content fluctuations. At low humidity values, the tape becomes brittle and tears easily, while at higher humidity values the rolls telescope, and the adhesive tape is difficult to tear off. Furthermore, the relatively aggressive adhesives attack to support film.

In view of these disadvantages, attempts were made subsequently to replace the cellulose hydrate support film by polymer foils or films. It was then discovered that, for example, adhesive tape with a support film of polyethylene terephthalate is too difficult to tear, while tapes based on cellulose acetate tear too easily. Tapes based on oriented polystyrene are too brittle and in addition have a low solvent resistance. Tapes with support foils of polyethylene, vinylidene chloride copolymers or plasticized polyvinyl chloride have little mechanical strength and are difficult to tear These facts are described very clearly in U.S. Pat. No. 3,089,786, the object of which is to provide an adhesive tape based on polyvinyl chloride, which would not have the disadvantages of the known tapes. However, it is also known that tapes made on the basis of polyvinyl chloride are easily split under impact-like transverse stresses and tend to tear in the longitudinal direction. Attempts were therefore made to replace the polyvinyl chloride support films with other polymer support films, all the more so since environmental problems could be attributed to tapes based on polyvinyl chloride if destroyed by burning.

Adhesive synthetic plastic tapes based on polyolefins are also known, for example, from DE-OS No. 29 38 471.

Most of the references describing self-adhesive materials, adhesive strips or adhesive tapes concern either methods to improve their adhesive properties, for example, UK Patent Application No. 2,001,079, which is also directed to an especially decorative appearance of the products described therein, or with better separating properties of the adhesive layers from the protective layers attached to them, such as, for example, U.S. Pat. No. 4,339,485. A reduction of the risk of damage to surfaces by means of adhesive tape and a self-adhesive tape coated with adhesive on both sides serving this purpose, are also described in British Pat. No. 1,562,680.

There are, however, applications conceivable, in which an adhesive tape is needed which has such good adhesive properties that it either cannot be removed at all from the substrate to which it has been once applied, and/or it is destroyed by its forcible or unauthorized removal, thereby furnishing indications either by damage to the substrate or by fragments remaining thereon of its removal, and which cannot be reused under any circumstances, once it has been removed.

Examples where such security adhesive tapes may be used are price labels in self-service stores or official seals on automobile license plates, calibration marks on timepieces and counters, seal markings, etc.

For such purposes there are used at the present time paper stickers which are mechanically embossed or prestamped and thus contain predetermined breaking points, whereby they yield only small fragments corresponding to their stamping, upon unauthorized removal. These stickers have the disadvantage that, prior to their application, they must always be exposed to an additional work step, i.e., that of stamping, and that because of the intentional breaking points contained in them, they are difficult to draw, for example, from a supply roll, in one piece.

SUMMARY OF THE INVENTION

It is therefore an object of the present invention to provide an improved security adhesive tape.

Another object of the invention resides in providing an adhesive security tape, which upon unauthorized removal from a substrate to which it has been adhesively applied, is destroyed.

It is also an object of the invention to provide an adhesive security tape which does not need to be subjected to a stamping or pressing step.

A further object of the invention is to provide such as adhesive tape which nevertheless easily drawn from a supply roll or removed from a protective layer.

Still another object of the invention resides in the provision of a process for producing the improved adhesive security tape according to the invention.

In accomplishing the foregoing objects, there has been provided a multilayer, delaminatable adhesive security tape, comprising an inner layer comprising a polymer or copolymer of an alpha-olefin having 2 to 6 carbon atoms, this layer containing a plurality of solid particles, preferably inorganic particles, having a dimension between about 0.2 to 20 microns in finely distributed form, in a quantity of from about 3 to 20% by weight with respect to the total weight of the polymer forming the inner layer; on both sides of the inner layer, a cover layer comprising a polymer or copolymer of an alpha-olefin having 2 to 4 carbon atoms; an adhesive layer on the side of one of the cover layers facing away from the inner layer; and an adhesive repellent layer on the other cover layer, again on its side facing away from the inner layer.

In accordance with another aspect of the invention, there has been provided a process for preparing a multilayer adhesive security tape, comprising the steps of providing a first heat-plastified synthetic resin composition comprising a polymer or copolymer of an alpha-olefin having 2 to 6 carbon atoms containing from about 3 to 20% by weight of a plurality of solid particles having a dimension of between about 0.2 and 20 microns in finely distributed form; providing a second and third heat-plastified synthetic resin composition, each comprising a polymer or copolymer of an alpha-olefin having 2 to 4 carbon atoms; co-extruding the first, second and third heat-plastified synthetic resin compositions to produce a multilayer tape comprising an inner layer of said first synthetic resin composition and a cover layer on each side of said inner layer, each cover layer comprising one of said second and third synthetic compositions; cooling the multilayer tape; biaxially orienting the multilayer tape by stretching in the longitudinal and transverse direction, wherein the longitudinal stretching is carried out at a temperature which is lower by as much as 20° C. than the normal stretching temperature for the alpha-olefin having 2 to 6 carbon atoms; heat setting the oriented multilayer tape; applying an adhesive layer to one of the cover layers; and applying an adhesive repelling layer to the other of the cover layers.

Further objects, features and advantages of the present invention will become apparent from the detailed description of preferred embodiments which follows, when considered with the attached figures of drawing.

DETAILED DESCRIPTION OF PREFERRED EMBODIMENTS

Figure 1:
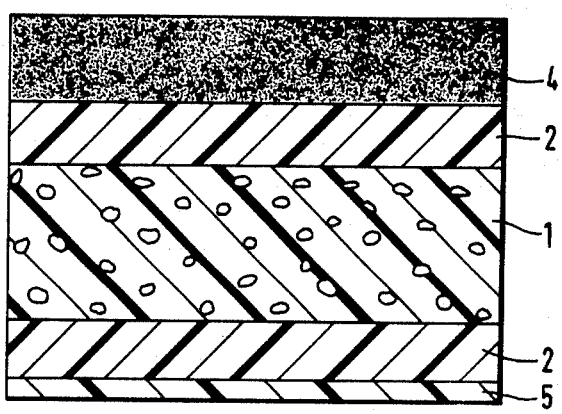
FIG. 1 is a cross-sectional view taken through an adhesive tape according to the invention, with cover layers having the same constitution.

The core of the adhesive tape according to the invention consists of an inner layer 1 of a polymer or copolymer of an alpha-olefin having 2 to 6 carbon atoms, preferably 2 to 4 carbon atoms, and most preferably a homopolymer or copolymer of propylene, especially a propylene homopolymer having an isotactic content of at least about 90%. Finely distributed, solid, especially inorganic particles with dimensions of 0.2 to 20 microns, preferably 2 to 8 microns, are contained in the inner layer in quantities of from about 3 to 20% by weight, preferably from about 5 to 15% by weight, with respect to the total weight of the polymer forming the layer. The particles consist of a conventional, preferably inorganic material, such as titanium dioxide, calcium carbonate or silicon dioxide. In principle, however, opaque organic particles, for example, of a crosslike synthetic resin, may also be used having a melting point higher than the temperatures encountered during the processing sequence.

The cover layer 2, 3, which together with the inner layer are produced by a coextrusion process, consist according to the invention of a polymer of an alpha-olefin, preferably homo- or copolymers of propylene with an ethylene proportion of up to about 10% by weight, which optionally may contain an addition of a maximum of 1% weight, with respect to the polymer forming the cover layer, or pigments to improve slipping properties. Pigments of this type are compounds based on silicic acid, for example, the sodium-aluminum silicates known as zeolites.

The cover layers may consist of different materials and have different thicknesses, but preferably they consist of the same material and have the same thickness, as this facilitates their preparation from a technical standpoint.

Destruction in the course of the tearing off of the adhesive tape according to the invention takes place by delamination. As the result of the presence of the inorganic particles in the inner layer 1 of the adhesive tape and the stretching temperatures lower by up to 20° C. microcracks appear inside the inner layer in the boundary zone between the inorganic medium and the polymer mass, together with extremely small pores, so-called vacuoles. This results in the fact that the inner layer is present in the form of a kind of "hole structure "; in any case, it possesses a certain porosity relative to the cover layers, which consist of a polymer of an alpha-olefin. According to the invention, therefore, a multilayer film with relatively smooth surfaces and a core containing vacuoles is obtained.

If now a highly adherent adhesive is applied to one side of the film obtained in this manner, the adhesion forces of which are greater, for example, on paper, than the forces required to tear the inner layer penetrated by vacuoles, and if this adhesive tape is placed into contact with a paper substrate, the adhesive tape will be delaminated in the plane of the film upon its removal from this substrate.

The adhesive force of the adhesive is determined by standards familiar to those skilled in the art (for example, AFERA Standard TL 7510-011), by finding the resistance to unwinding. Suitable adhesives which can be used in the adhesive tape according to the invention are adhesives based on rubber or acrylate. These are conventional adhesives.

However, in order to insure that the adhesive tape coated according to the invention may be drawn without difficulty from the supply roll onto which it is normally wound and that it is not already destroyed by delamination in the course of this process, thereby becoming useless, the side opposite to the surface coated with the adhesive must be coated with a layer repelling the adhesive, a so-called release coat. Coatings of this type are known in the literature. Higher fatty acid esters, waxes such as, for example, montan wax, a mixture of esters of montanic acid with various waxy alcohols may be used for this purpose. Also mixtures of polyurethanes with polyvinylalcohol are suitable.

The invention will be described in more detail with reference to the figures of drawing attached hereto.

FIG. 1 shows in detail the construction of the security adhesive tape according to the invention, comprising the inner layer 1 with the vacuoles, two cover layers 2, both of polypropylene having the same composition, the adhesive layer 4 and the adhesive-repellent protective layer 5, designated the release coat.

Figure 2:
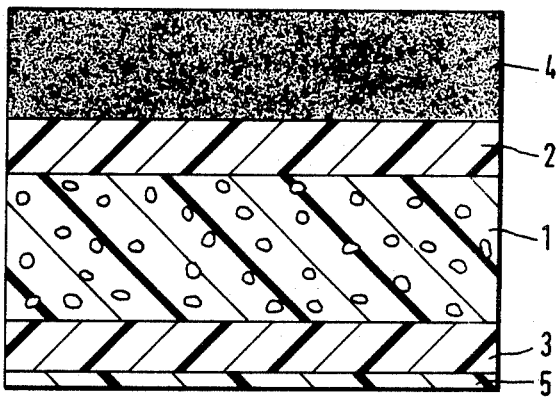
FIG. 2 is a cross-sectional view taken through an adhesive tape with cover layers having different constitutions.

FIG. 2 also shows an inner layer 1 with vacuoles, a cover layer 2 of polypropylene, a second cover layer 3 of a polypropylene copolymer with a pigment addition, the adhesive layer 4 and a release coat 5.

EXAMPLES 1. (Comparative) A biaxially stretched, 35 μm thick polypropylene film consisting of a polypropylene homopolymer and a three-layer film capable of sealing and consisting of a base layer of a polypropylene homopolymer and cover layers of a $C_2/C_3$ copolymer (also 35 μm), were coated under the usual conditions on the front side with a rubber adhesive and on the reverse side with a release coat of montan wax.

The adhesive tapes prepared from this coated film may be used in the known manner, for example, for the sealing of boxes. The adhesive tape may then be removed from the box without tearing or destroying the tape.

2. A film according to the invention, again with a total thickness of 35 μm, consisting in this case of an inner layer with a thickness of 25 to 30 μm and constituted by a polypropylene homopolymer modified with 10% finely ground calcium carbonate, and of cover layers, identical on both sides, or an unmodified polypropylene with a thickness of 3 to 5 μm, and which has been stretched at stretching temperature lower by 10 ° to 15° C. compared to the conventional stretching technology for polypropylene, was coated on one side with an acrylate adhesive providing the film with an unwinding strength according to AFERA Standard TL 7510-011 of more than 8 N/25 mm strip width, and on the reverse side with the afore-mentioned release coat and then cut. The adhesive tape according to the invention may be drawn without difficulty from the roll of tape and used for the sealing of boxes and other containers, but is always completely destroyed by delamination upon its removal (tearing off) from the substrate.

What is claimed is:

1. A multilayer, biaxially oriented, delaminatable adhesive security tape, comprising:
    an inner layer comprising a polymer or copolymer of an alpha-olefin having 2 to 6 carbon atoms, said layer including a plurality of solid particles having a dimension between about 0.2 and 20 microns in finely distributed form, in a quantity of from about 3 to 20% by weight with respect to the total weight of the polymer forming the inner layer, and a plurality of microcracks and small pores of vacuoles at the boundary zone between said alpha-olefin polymer or copolymer and said solid particles;
    on both sides of said inner layer, a cover layer comprising a polymer or copolymer of an alpha-olefin having 2 to 4 carbon atoms;
    an adhesive layer on the side of one of said cover layers facing away from the inner layer; and
    an adhesive repellent layer on the other cover layer, again on its side facing away from the inner layer.

2. A multilayer, delaminatable adhesive security tape according to claim 1, wherein said solid particles are inorganic particles.

3. A multilayer, delaminatable adhesive security tape according to claim 1, wherein the amount of said particles is between about 5 and 15% by weight.

4. A multilayer, delaminatable adhesive security tape according to claim 1, wherein said inner layer is comprised of a polymer or copolymer of an alpha-olefin having 2 to 4 carbon atoms.

5. A multilayer, delaminatable adhesive security tape according to claim 4, wherein said inner layer is comprised of a co- or homopolymer of propylene.

6. A multilayer, delaminatable adhesive security tape according to claim 5, wherein said inner layer is comprised of a propylene homopolymer having an isotactic component of at least about 90%.

7. A multilayer, delaminatable adhesive security tape according to claim 1, wherein said cover layers have the same constitution and comprise homo- or copolymers of propylene with ethylene.

8. A multilayer, delaminatable adhesive security tape according to claim 7, wherein said cover layers further comprise from about 0.1 to 1% by weight, with respect to the total weight of the polymers forming the layer, of a pigment suitable for improving slipping properties.

9. A multilayer, delaminatable adhesive security tape according to claim 1, wherein said adhesive layer comprises a rubber or acrylate adhesive sufficient to provide the tape with a resistance to unwinding of more than about 5 N/25 mm of strip width.

10. A multilayer, delaminatable adhesive security tape according to claim 1, wherein the adhesive repellent layer comprises a mixture of polyurethane with polyvinyl alcohol, or a higher fatty acid ester.

11. A multilayer, delaminatable adhesive security tape according to claim 1, having a total thickness of from about 15 to 60 microns.

12. A multilayer, delaminatable adhesive security tape according to claim 11, having a total thickness of from about 20 to 50 microns.

13. A multilayer, biaxially oriented, delaminatable adhesive security tape, comprising:
    an inner layer comprising a polymer or copolymer of an alpha-olefin having 2 to 6 carbon atoms, said layer including a plurality of solid particles having a dimension between about 0.2 and 20 microns in finely distributed form, in a quantity of from about 3 to 20% by weight with respect to the total weight of the polymer forming the inner layer, and a plurality of microcracks and small pores or vacuoles at the boundary zone between said alpha-olefin polymer or copolymer and said solid particles;
    on both sides of said inner layer, a cover layer comprising a polymer or copolymer of an alpha-olefin having 2 to 4 carbon atoms;
    an adhesive layer on the side of one of said cover layers facing away from the inner layer; and
    an adhesive repellent layer on the other cover layer, again on its side facing away from the inner layer, wherein the tape is delaminatable along a plane defined by said inner layer.

* * * * *